United States Patent
Griensteidl et al.

[11] 3,841,350
[45] Oct. 15, 1974

[54] RAPID SHUTOFF SAFETY VALVE

[76] Inventors: Gerhard Griensteidl, Bluetenstrasse 10, 8000 Muenchen-Karlsfeld; Helmut Michel, Hauptstrasse 22, 73 Esslingen-Sulzgries, both of Germany

[22] Filed: Aug. 14, 1972

[21] Appl. No.: 280,584

[52] U.S. Cl............. 137/516.27, 137/517, 137/519
[51] Int. Cl............................................. F16k 15/00
[58] Field of Search ........... 137/458, 459, 460, 461, 137/470, 484.2, 484.4, 517, 519, 533, 137/516.25, 516.27; 98/119; 239/571, 572

[56] References Cited
UNITED STATES PATENTS

| | | | |
|---|---|---|---|
| 662,819 | 11/1900 | Ravier et al. | 137/460 |
| 3,132,666 | 5/1964 | Nelson | 137/519.5 X |
| 3,326,233 | 6/1967 | Perruzzi | 137/519 X |

FOREIGN PATENTS OR APPLICATIONS

| | | | |
|---|---|---|---|
| 1,155,648 | 10/1963 | Germany | |
| 15,051 | 11/1913 | Great Britain | 137/459 |

*Primary Examiner*—Robert G. Nilson
*Attorney, Agent, or Firm*—Wolfgang G. Fasse

[57] ABSTRACT

The present rapid shutoff valve especially for gaseous media has a flow passing aperture facing a movably supported closure disk. The aperture is surrounded by a shaped nozzle ring portion which together with said disk forms a Laval nozzle in response to the speed of said flow impinging upon said closure disk. The nozzle ring portion is surrounded by an outer ring portion which forms a ring gap with a respective outer ring portion of the closure disk. The valve is closed when the two outer ring portions contact each other.

23 Claims, 7 Drawing Figures

RAPID SHUTOFF SAFETY VALVE

BACKGROUND OF THE INVENTION

The present invention relates to a rapid shutoff valve, especially for gaseous media. Problems requiring extremely fast closing rates cannot be solved by simple shutoff members which essentially operate in response to pressure head and static pressure difference. This holds true even if masses are held low or where masses are counterbalanced. Rather, it has been found to be necessary to employ the dynamic pressure difference, for example of a gas, which is many times more effective for achieving extremely short closing times.

OBJECTS OF THE INVENTION

In view of the foregoing, it is the aim of the invention to achieve the following objects singly or in combination:

to provide a shutoff valve capable of closing within extremely short closing times;

to provide a rapid shutoff valve especially for gaseous or fluid media capable of taking up or arresting pressure surge pulses in order to avoid, for example, an interference with processes in progress in a vacuum or to protect sensitive elements;

to avoid the admixture of two or polyphase flows, such as flue dust or other, single or polyphase flows;

to provide a valve for use where the media to be admixed have different or fluctuating inlet pressures;

to provide a valve capable of keeping the gas dynamic effects in an apparatus below the respective danger levels, for example, the effects or reactions which would be triggered or caused when a rotor fails in a gas centrifuge;

to avoid a chain reaction, for example, the failure of further rotors when one rotor fails in a gas centrifuge;

to intercept the gas dynamical surge or shock in the gas pressure and the attendant contamination by means of a technically simple rapid closing valve which is economical in manufacture and which assures an absolutely safe effectiveness; and to movably arrange a closure disk relative to two different orifice means in such a manner, that depending on the flow direction the disk will form a Laval nozzle either with one or with the other of siad orifice means.

SUMMARY OF THE INVENTION

According to the invention there is provided a valve in which an axially, movably mounted plate or disk is disposed upstream of an aperture in an orifice means as viewed in the direction of the gas flow to be interrupted, wherein said plate or disk together with the orifice means forms a narrow outer ring gap which is sealed when the disk contacts the orifice means, and wherein said disk together with the orifice means forms an orifice gap which constitutes a Laval nozzle either at all times or when the disk is just ahead of its closed position depending on the velocity of the flow impinging upon the disk. Thus, at subsonic flow speeds said Laval nozzle is formed when said disk is just ahead of its closing position, while at supersonic flow speeds the Laval nozzle is already formed when the disk is in its normal open rest position.

It has been recognized according to the invention that a rapid closure of the aperture in the orifice means can be achieved only when the gas dynamic effect is utilized. Thus, the orifice means and the plate or disk must be constructed so that the plate can be lifted from its neutral position and the aperture firmly closed off by gas dynamic action.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
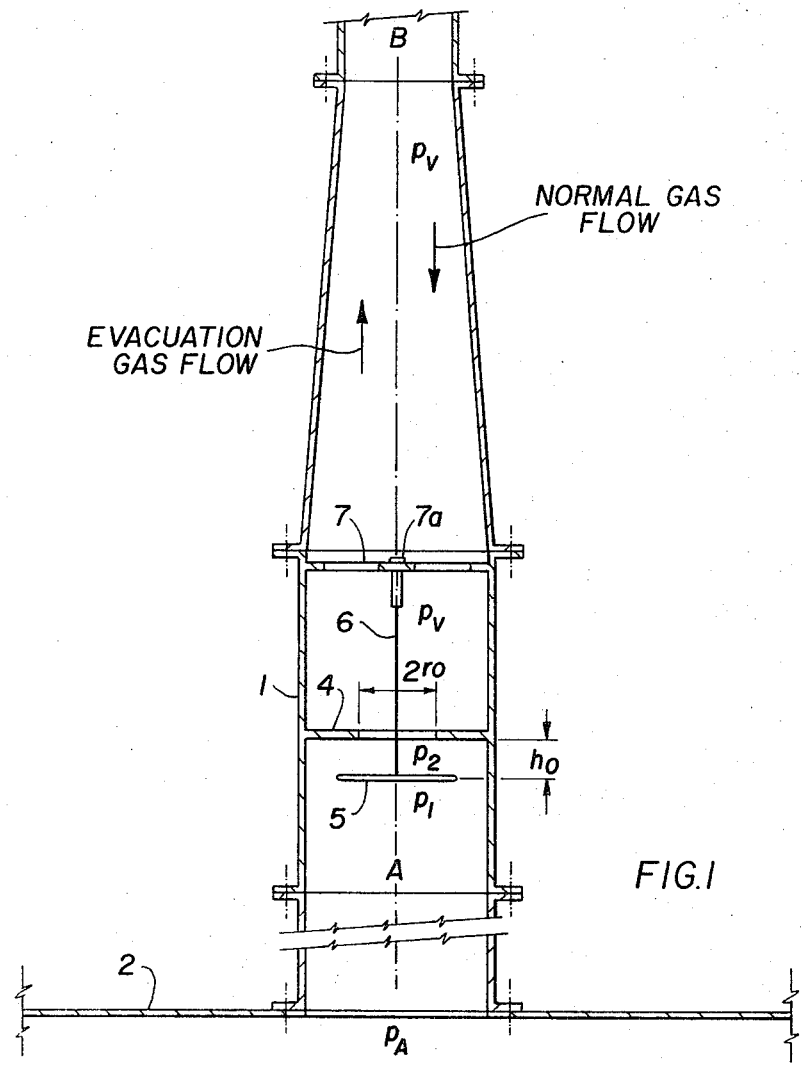
FIG. 1 is a sectional view through a rapid closing safety valve according to the invention.

Referring to FIG. 1 the valve includes a housing 1, for example, a tubular member arranged between a vessel or centrifuge 2 and a conical conduit 3. Orifice means 4 with an aperture having a diameter of $2r_o$ are supported in the housing 1. A round plate or closure disk 5 is centrally suspended in front of the orifice means 4 at a distance $h_o$ by means of a guide pin or filament 6 which extends through the aperture and which is attached to a bridge 7 adjacent to the conical conduit. The length of the filament or guide pin 6 and thus the distance $h_o$ between the plate 5 and the orifice means 4 is variable by means of an adjusting screw 7a movably supported in the bridge.

The pressure $p_v$ prevails above the orifice means 4. The pressure $p_1$ prevails below the closure plate 5. The pressure $p_2$ prevails in the spacing between the plate 5 and the orifice means 4. This will be described in more detail below. In normal operation, gas flows in the direction from B to A and during evacuation, in the opposite direction from A to B. Thus, it will be appreciated that the aperture in the orifice means 4 may be kept open for the passage of slowly moving gas in either direction. Such open position of the valve is possible since the response sensitivity of the valve may be varied as a function of the plate to orifice means distance $h_o$ or of the plate mass $M_p$. The criteria for these magnitudes are the gas velocity at evacuation and the gas velocity at actuation of the shutoff unit. However, at comparatively high process rates or speeds during normal undisturbed separating operation of the centrifuge, the closing effect due to the gas dynamic paradox must also be considered when adjusting $h_o$ or $M_p$.

When a rotor fails or air invades the apparatus gas will rush in the direction from A to B, the gas shutoff direction. The plate 5 is then pulled against the aperture in the orifice means 4 to block the aperture. The onrushing gas converts its kinetic energy into potential energy, or rather pressure, which operates to firmly close the plate against the orifice means. A rapid attraction of the plate 5, however, is possible only in the presence of a pressure difference produced across the plate by gas dynamic processes.

Figure 2:
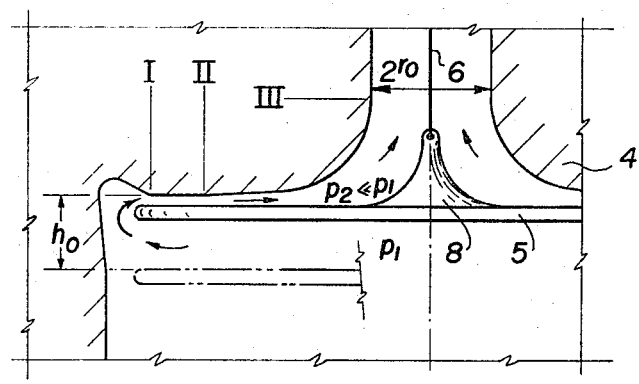
FIG. 2 illustrates on a larger scale than FIG. 1 the configuration of the orifice gap in accordance with this invention wherein the speed of the flow impinging on the disk is subsonic.

FIG. 2 illustrates a partial view of FIG. 1 on a larger scale showing the valve of the present invention with its plate under the action of subsonic flow. The plate 5 is supported by the filament 6 and is shown in its upward motion shortly before closure of the orifice means 4. The neutral position of the plate 5 at a distance $h_o$ from the sealing surface of the orifice means 4 is indicated by a dashed line. The direction of gas flow is marked by the arrows. An outer ring portion of the orifice means 4 and an outer ring portion of the plate 5 confine a sealing ring gap extending from I to II. The surface II-–III of an inner ring portion together with a respective inner ring portion of the plate 5 form an orifice gap which corresponds to the effective expansion space (Laval nozzle). It will be noted that the pressure $p_2$ prevailing in the orifice gap is substantially smaller than the pressure $p_1$ upstream of the plate 5. The plate portion 8 projecting into the aperture in the channel or orifice gap region is desirable to facilitate flow conditions.

Figure 3:
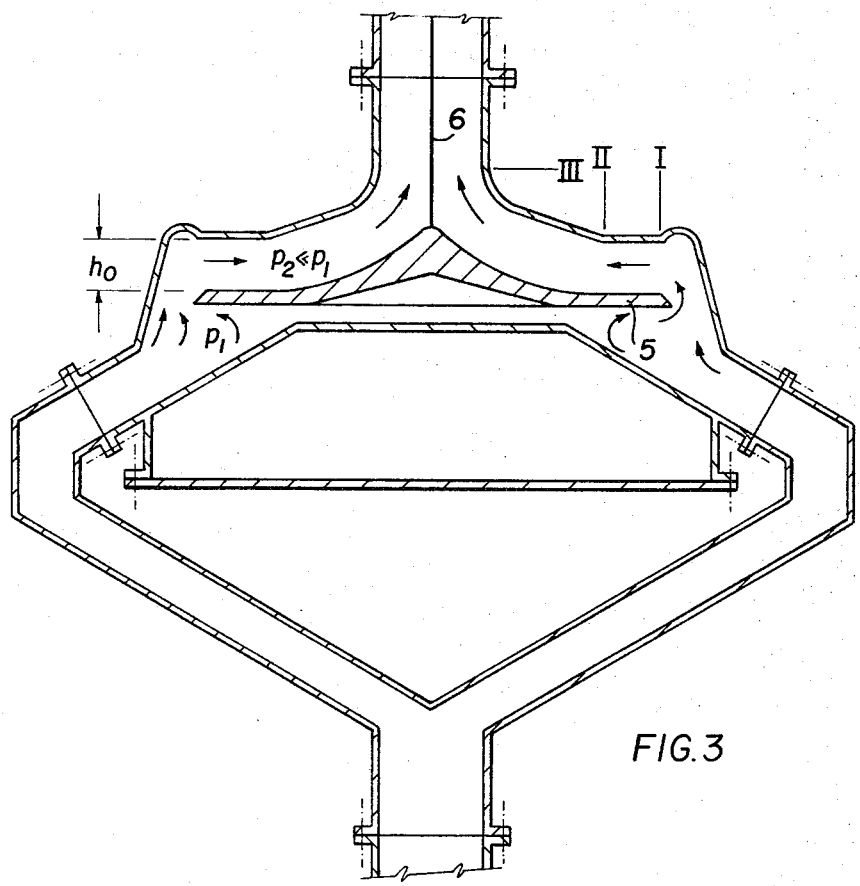
FIG. 3 illustrates also on a larger scale than FIG. 1 the configuration of the orifice gap in accordance with this invention wherein the speed of the flow impinging on the disk is supersonic.

FIG. 3 shows the basic structure of the valve of this invention wherein the plate 5 is under the action of supersonic flow. In this alternative embodiment the gas pulse flow is split, for example into two streams. The flow is directed through nozzles to the lower side of the plate 5 which forms together with the orifice means an orifice gap II-III which constitutes a Laval nozzle even when the plate 5 is in its neutral position at a distance $h_o$ from the orifice means. The surging supersonic flow expands in the Laval nozzle so that the pressure $p_2$ above the plate 5 is considerably smaller than the pressure $p_1$ below the plate 5. As a result the plate is pressed rapidly against the sealing surface of the outer ring I-II of the orifice means. The remaining gas surge which is prevented from passing the aperture forms a "static" positive pressure which presses the plate 5, suspended by a filament 6, into its sealing position.

Figure 4:
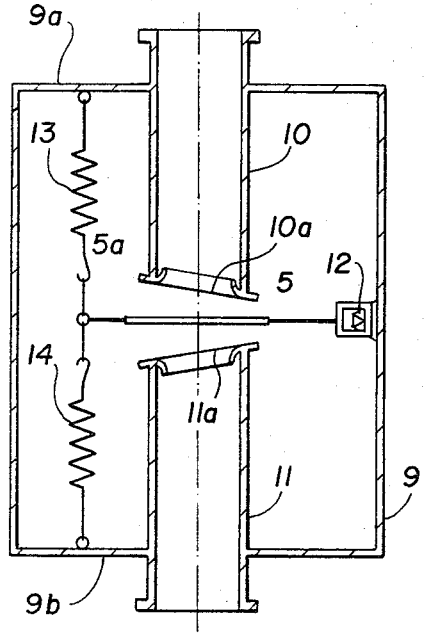
FIG. 4 shows a sectional view through an embodiment having a pivotally supported closure disk cooperating with one or the other of two orifice means depending upon the direction of the flow to be shutoff whereby spring means hold the disk in its normal open position.
Figure 5:
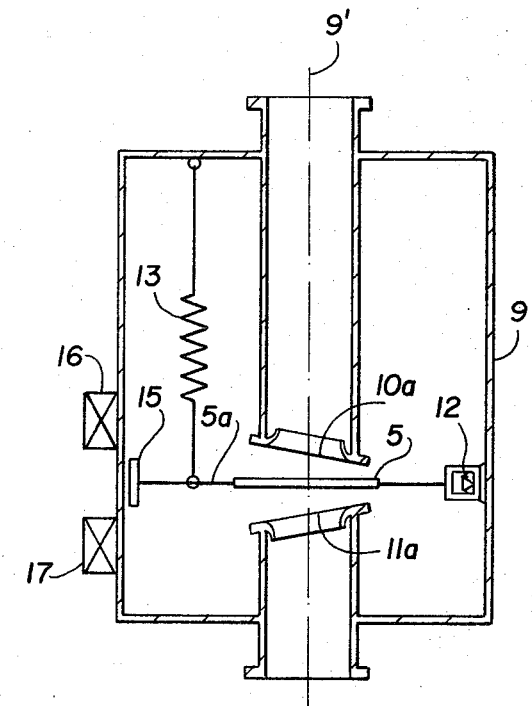
FIG. 5 illustrates an embodiment similar to that of FIG. 4 but with spring and magnet means for controlling the closure disk.

FIG. 4 shows a cylindrical valve housing 9 having a longitudinal axis (see FIG. 5). In this embodiment the orifice means comprise two tubular members 10 and 11 extending through the end walls 9a and 9b of the housing 9. The members 10 and 11 have two opposite chamfered ends facing each other and forming apertures 10a and 11a. Between these chamfered ends the plate 5 is carried on a rocker arm 5a which is supported in the housing 9 by means of a knife-edge bearing 12. The middle or neutral position of the plate 5 is maintained by means of two resilient elements such as springs 13 and 14. The chamfer on the faces of the tubular members 10 and 11 is provided to accommodate the rocker arm motion of the plate 5.

The valve of FIG. 5 differs from that of FIG. 4 essentially in that a single resilient element 13 is employed to sustain the pivotally mounted plate 5 on the rocker arm 5a in its middle position. The rocker arm 5a is again supported on a knife-edge bearing 12 at one of its ends. The other end carries a plate 15 closely spaced from the inner wall of the housing 9. Magnets 16 and 17 are arranged on the housing 9 on either side of the rocker arm 5a in its middle position to hold the rocker arm through the plate 15 in one or the other of its extreme positions for shutting one or the other of the apertures 10a and 11a with the plate 5 for as long as is desirable.

Figure 6:
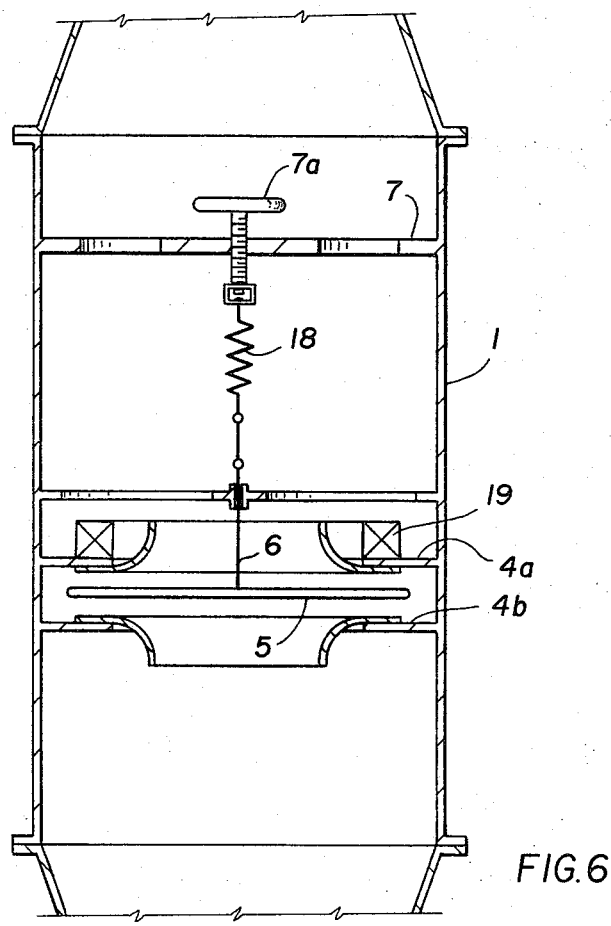
FIG. 6 shows an embodiment similar to that of FIG. 1 but modified for controlling the flow in one or the other direction longitudinally through the valve, wherein the closure disk is supported by axially extending spring means.

FIG. 6 illustrates an embodiment of the present invention similar to that of FIG. 1, except that two orifice means 4a and 4b are arranged in the tubular housing 1. A plate 5 is held by a guide pin 6 which is in turn suspended from an adjusting screw 7a seated in a bridge 7. The guide pin 6 which extends along the longitudinal axis of the housing is connected to the adjusting screw 7 by means of a spring 18 to hold the plate 5 in its middle position between the two orifice means. The orifice means 4a comprise an annular magnet 19 for providing a permanent or temporary tight closure when the plate 5 contacts the orifice means 4a.

Figure 7:
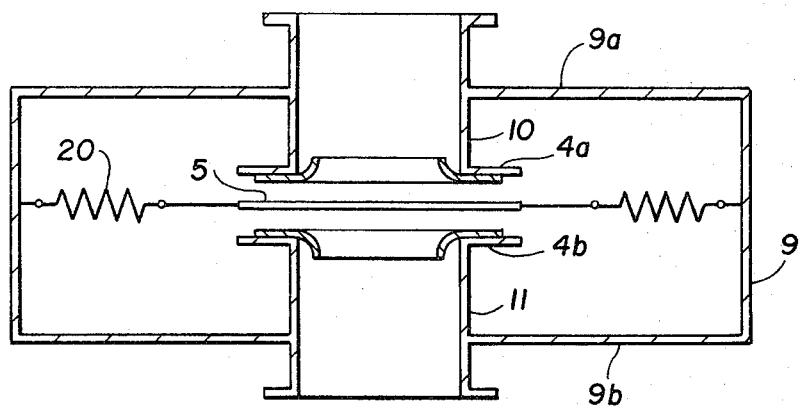
FIG. 7 shows a modification of FIG. 6 wherein the closure disk is supported by radially extending spring means.

FIG. 7 illustrates a valve in accordance with this invention in which the plate 5 is arranged for freedom of axial movement between the two orifice means 4a and 4b which are attached to the ends of the tubular members 10 and 11 facing each other. The free axial movement of the disk or plate 5 is achieved by means of resilient elements such as springs 20 which are attached to the housing 9. The springs 20 extend in the plate defined by the plate 5 and are distributed radially and substantially around the circumference of the plate 5, whereby the planes of the plate and of the orifice means are kept in parallel to each other when moving or seating the plate against one or the other orifice means 4a or 4b. The resilient elements can optionally be connected to the end walls 9a and 9b to act on the plate in an axial direction whereby the housing may have a smaller diameter than that with the radially extending springs.

The basic concepts and considerations underlying the invention will now be described, whereby the following designations will be employed:

$p_A$ = pressure rise in vessel 2

$p_1$ = pressure upstream of plate or disk 5

$p_2$ = pressure downstream of plate 5

$p_v$ = pressure downstream of orifice means 4

$\pi L \geq 0.6$ = critical Laval pressure ratio

1. $p_1/p_A > \pi_L$: The gas from the vessel impinges on the plate at subsonic speed and expands from the orifice means at the speed of sound whereby the plate is pulled against the orifice means but does not fully close it off. The plate tends to flutter in front of the orifice means at a distance of $h_{min} \geq 0.5 \times r_o$, where $r_o$ is the radius of the aperture in the orifice means, until the pressure upstream of the plate has risen sufficiently to press the plate against the orifice means under "static" pressure. It has been found that this process takes too long and calls for improvement. The prior art does not alleviate this condition.

2. $p_1/p_A < \pi L$: The gas impinges on the plate at supersonic speed, which may be possible if the exit port of the vessel has the shape of a Laval nozzle. However, conically flaring exit port sections extending in the direction of the gas pressure surge should be avoided if possible. However, where such conical exit ports cannot be avoided, a flat closure plate cannot be used since it would fail to close in a gas dynamic fashion as taught by the invention.

3. $p_2/p_1 > \pi L$: This case corresponds to the first case in that the plate flutters in front of the orifice means. It has been found that the orifice means and the plate must be improved to avoid this drawback.

4. $p_2/p_1 < \pi L$: In its passage through the orifice gap, the gas expands at supersonic speed. The plate is pressed against the orifice means. To permit the gas to expand in the gap between the plate and the orifice means, that is, in the orifice gap it has been found that the passageway must be widened in that area. This widening according to the invention is not shown in the schematic illustration of FIG. 1, but it is shown in FIG. 2, for example.

5. $p_v/p_1 > \pi L$: The plate fails to close in that the gas flows out at subsonic speed. This is desirable inasmuch as $p_1$  0.6 $p_v$ which is below the response level.

6. $p_v/p_1 < \pi L$: The speed of the flow through the orifice gap is sonic and through the aperture in the orifice means it is supersonic. The gas expands in the orifice means whereby the pressure is reduced. As a result, the dynamic pressure upstream of the plate is greater than that in the orifice gap. Thus, the plate is pressed against the mouth of the orifice means if the orifice means and the plate are shaped to form a Laval nozzle as taught by the invention.

The present Laval type nozzle must be capable of guiding supersonic gases in the orifice gap namely the space between the plate 5 and the orifice means; otherwise, the plate will flutter in front of the orifice means during the gas dynamic penetration.

According to the invention it has been recognized that the desirable geometry of the plate and the orifice means depends on the velocity of the gas impinging on the plate. Distinction can be made between two cases, from which the geometric requirements may be defined. First, where the flow impinging on the plate is subsonic, the invention teaches that the orifice gap must form a Laval nozzle shortly before the closure by the plate 5. Second, where the flow impinging on the plate is supersonic, the invention teaches that the orifice gap must always form a Laval nozzle.

The second requirement must be satisfied only to the extent that the oncoming supersonic gas pulse can expand to small pressures in the orifice gap whereby a gas dynamic negative pressure is produced in the gap and the plate will be attracted.

Since the mass of the plate affects the closing rate, it must be sufficiently small, preferably in the range of 1 to 5 grams, and the plate to orifice distance $h_o$ should not be greater than $2r_o$.

When the pressure in the vessel or the conduits rises, for example when the rotor fails or air invades the centrifuge, a pressure front rushes towards the heavily evacuated space. In the process, gas particles are moving through the orifice means. As a result of the expansion of the gases in the orifice gap, that is, in the space between the plate and the orifice means, the pressure $p_2$ drops below the pressure $p_1$ upstream of the plate. This produces a component of a force which presses the plate against the orifice means also against the force of gravity.

When an excessive pulse or pressure difference occurs, a negative pressure is built up in the orifice gap according to the laws of Bernoulli and Laval, which imparts lift to the plate as to an airfoil and presses it rapidly against the opening in the orifice means. The force of attraction increases as the distance between the orifice means and the plate decreases. The orifice means will be closed before the peak of the gas pressure has passed through.

When air is invading the centrifuge or the space upstream of the plate, the calculated closing rates are a few $10^{-1}$ milliseconds. It appears that a configuration of the orifice means and the plate as taught by the invention, will achieve a closing rate of 1 ms in the event of air invasion.

When a rotor fails without air invasion, the gas dynamic relationships are less favorable. The thermodynamic properties of the outflowing gas mixture are different. The mixture is substantially heavier than air whereby the closing rates are slower. The calculated closing rates according to the invention are nevertheless still 1 ms or so, given the following conditions:

$p_1/p_v = 2$; $h_o < 5$ mm; plate mass $< 4$ gram; molecular weight of the gas $= 356$ kg/kmol.

Since the closure is achieved in a gas dynamic manner and not statically, the gas dynamically operated rapid-closing valve of this invention exhibits a notable degree of adaptability, the faster the pressure in the vessel is growing and the greater the pressure, the faster the closing action. The gas dynamic rapid-closing member does not close at a predetermined pressure level but rather at a predetermined gas pressure ratio $p_1/p_2$, which may be made variable by means of the adjusting screw 7a which varies the position of the plate 5. This is a substantial advance in the art which the invention has achieved. The closing rate is essentially a function of the geometry of the closing members of the plate mass, and of the traveling velocity of the pressure surge pulse. Thus, the closing rate is adjustable.

Permanent closure is achieved by the higher static pressure which becomes effective a short time after closure and which remains effective until pressure balance occurs or is made to occur.

When the pressure is equalized, the present shut-off valve opens automatically. A relatively quick opening of the valve may be accomplished by controlled leakage. On the other hand, the valve can be kept close deliberately for any desirable duration by means of permanent magnets or by electromagnets. For this purpose, the orifice means and/or other parts may form the magnets.

The additional use of magnets and their magnetic effect serves to improve the closing rate, to prevent intermittent flutter of the shut-off disk where this may be encountered, and it assures a permanent and/or temporary tight closure. This is important, especially when it is intended to shield downstream components not only from the pressure surge but also from foreign material, such as liquids, acids, vapors, dirt particles, abrasion, crystals and the like.

With regard to FIGS. 4 to 7 it will be appreciated that closure in one or the other flow direction is achieved by the closure plate between two orifice means.

When the pressure head exceeds a set response value, the plate leaves its neutral position or rest position and drops at an accelerated rate onto one of the orifice means due to the gas dynamic suction. The gas dynamic negative pressure assures an extremely rapid closure and a forceful seating pressure with a minimum of delay. A closure disk is preferred over a spherical shape for use as a closing element because the pronounced negative gas dynamic pressure cannot effectively be produced in connection with a spherical closure member.

As mentioned, the present valve is especially effective wherever pressure surge pulses may reach a vacuum containing sensitive instruments, for example centrifuge rotors and also where high pressure gases may flow towards lower pressure, for example the atmosphere.

The duration of closure depends on the static pressure difference $p_1 - p_v$ and on the mass of the plate. Unless it is affixed or magnetically held in the closed position, the plate drops off practically when $p_1 \approx p_v$, that is, when the pressure is balanced. However, the gas dynamic effect will assure closure when penetration exists.

Another advantage is seen in that before dropping off, the plate will flutter at a short distance from the orifice means whereby the pressure balance is established gradually and safely.

Although the invention has been described with reference to specific example embodiments, it is to be understood that it is intended to cover all modifications and equivalents within the scope of the appended claims.

What is claimed is:

1. An automatic rapid shutoff safety valve, especially for gaseous media, comprising a valve housing having a central axis, a first port in said housing, a second port in said housing, said ports defining a first flow direction from said first port to said second port for a first flow to be interrupted in response to a given speed of said first flow, said ports defining a second flow direction opposite to said first flow direction for a second, normal flow, orifice means supported in said housing for defining an aperture of given diameter through which said first and second flow normally pass, a closure disk having a first surface facing said first flow and a second surface facing said second flow, means for movably supporting said closure disk in said housing upstream of said aperture as viewed in said first flow direction whereby the first flow impinges substantially at right angles on at least a portion of said first flow facing surface of the closure disk which is axially movable relative to said aperture, said orifice means including an outer ring portion, said closure disk also including an outer ring portion, said outer ring portions having a diameter substantially larger than said given diameter of said aperture, said outer ring portions forming a ring gap which is sealed when said outer ring portions contact each other, said gap providing a sufficient spacing between said orifice means and said closure disk to keep the valve open under normal flow conditions and to close the valve rapidly by the first flow exceeding said given speed, said orifice means further including an inner ring portion located between said outer ring portion and said aperture of said orifice means, said inner ring portion facing said closure disk and having such a shape as to form an orifice gap with the closure disk, said orifice gap representing a Laval nozzle in response to the speed of said first flow impinging upon said closure disk.

2. The valve according to claim 1, wherein said orifice gap constitutes a Laval nozzle just prior to the closing of the aperture by said closure disk in response to a subsonic flow speed.

3. The valve according to claim 1, wherein said orifice gap constitutes a Laval nozzle when said closure disk is in an open rest position and in response to supersonic flow speed.

4. The valve according to claim 1, wherein said orifice means comprise two tubular members arranged in said housing, said tubular members having ends shaped to form said ring gap and said orifice gap, said shaped ends of said tubular members facing each other with a spacing therebetween, said closure disk being located in said spacing between said shaped ends of the tubular members.

5. The valve according to claim 1, wherein said means for movably supporting said closure disk comprise a bridge secured in said housing and having flow passages therethrough, a closure disk support member, means for axially and movably securing one end of the support member to said bridge, said support member extending substantially along said central axis in said housing, said support member having its other end secured to said closure disk.

6. The valve according to claim 5, wherein said support member is a guide pin.

7. The valve according to claim 5, wherein said support member is a filament wire.

8. The valve according to claim 5, wherein said support member is axially extending spring.

9. The valve according to claim 5, wherein said means for securing one end of the support member to said bridge comprise an adjusting screw movably held in said bridge whereby the spacing between the orifice means and the closure disk is adjustable.

10. The valve according to claim 1, wherein said means for movably supporting said closure disk in said housing comprise a plurality of spring elements which are distributed substantially evenly about the circumference of said closure disk, said spring elements being connected to said closure disk and to said housing whereby the closure disk is held in a rest position.

11. The valve according to claim 10, wherein said spring elements extend radially outwardly relative to said closure disk.

12. The valve according to claim 1, wherein said closure disk comprises a rocker arm, said means for movably supporting the closure disk comprising pivot bearing means for securing one end of said rocker arm to said housing, and substantially axially extending spring means connected between said housing and said rocker arm for returning said closure disk to its rest position.

13. The valve according to claim 12, wherein said pivot bearing means comprise knife edge bearing means.

14. The valve according to claim 1, further comprising magnet means for controlling the position of said closure disk.

15. The valve according to claim 14, wherein said magnet means are supported by said housing.

16. The valve according to claim 14, wherein said magnet means are supported by said orifice means.

17. The valve according to claim 1, wherein said closure disk has a relatively small mass, substantially in the range of 1 to 5 grams.

18. The valve according to claim 1, wherein said means for movably supporting said closure disk normally maintain said closure disk at a spacing from said orifice means, said spacing being smaller than said given diameter of said aperture.

19. The valve according to claim 1, wherein said closure disk comprises a flow facilitating central member facing into said aperture.

20. The valve according to claim 1, wherein said orifice means comprise a first orifice member and a second orifice member supported in said housing with a spacing therebetween, said closure disk being arranged between said first and second orifice members.

21. The valve according to claim 20, wherein said means for movably supporting said closure disk comprise a support bridge and axially extending spring means for connecting the closure disk to the support bridge.

22. The valve according to claim 20, wherein said means for movably supporting said closure disk comprise a plurality of spring members extending radially relative to said disk for connecting said disk to said housing.

23. The valve according to claim 1, wherein said orifice means facing said closure disk are chamfered.

* * * * *

UNITED STATES PATENT OFFICE
CERTIFICATE OF CORRECTION

Patent No. 3,841,350      Dated October 15, 1974

Inventor(s) Gerhard Griensteidl et al

It is certified that error appears in the above-identified patent and that said Letters Patent are hereby corrected as shown below:

[30] Foreign Application Priority Data

August 13, 1971      Germany      2140629./

Column 8, line 34 before "axially" insert --an--

Signed and sealed this 11th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,841,350　　　　　　　　Dated October 15, 1974

Inventor(s) Gerhard Griensteidl et al.

It is certified that error appears in the above-identified patent and that said Letters Patent are hereby corrected as shown below:

On the cover sheet insert:

-- [73] Assignee:　　Maschinenfabrik Augsburg-Nuernberg

Aktiengesellschaft, Muenchen, Germany --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*